Oct. 23, 1923.
M. C. WILLS ET AL
1,471,537
CHAIN CONNECTOR
Filed April 17, 1922
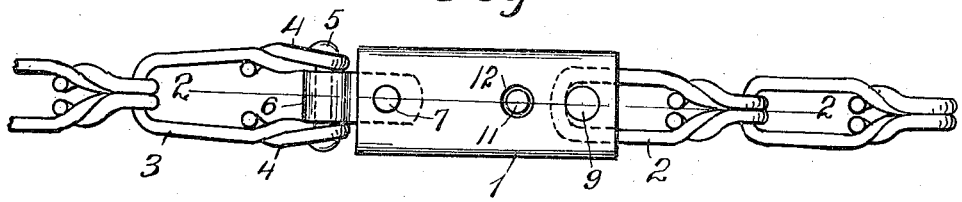
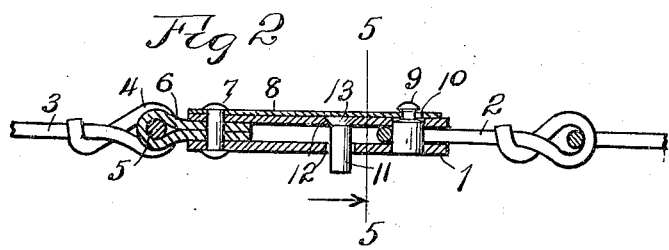
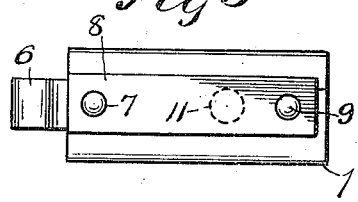
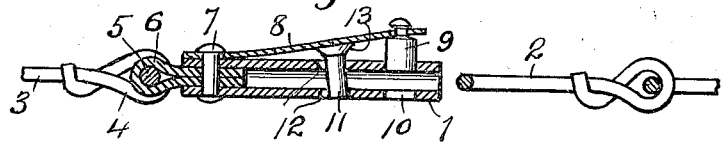
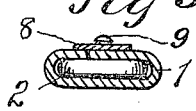
Marion C. Wills  
Joseph S. Daniel  INVENTORS
BY Warren D. House
Their ATTORNEY.
Witness:  
R. E. Hamilton Patented Oct. 23, 1923.

1,471,537

UNITED STATES PATENT OFFICE.

MARION C. WILLS, OF PLATTE CITY, AND JOSEPH S. DANIEL, OF KANSAS CITY, MISSOURI.

CHAIN CONNECTOR.

Application filed April 17, 1922. Serial No. 554,125.

*To all whom it may concern:*

Be it known that we, MARION C. WILLS and JOSEPH S. DANIEL, citizens of the United States, residing, respectively, at Platte City, in the county of Platte and State of Missouri, and Kansas City, in the county of Jackson and State of Missouri, have invented a certain new and useful Improvement in Chain Connectors, of which the following is a specification.

Our invention relates to improvements in chain connectors, particularly adapted for use in connecting the end links of an automobile tire chain.

One of the objects of our invention is to provide a chain connector of the kind described, which is simple, durable, not liable to get out of order, which is cheap to manufacture, which may readily be applied to chains now in use, which can be easily and quickly locked or released, which will not injure the tire, and which will securely hold the ends of the chain under all conditions of use.

The novel features of our invention are hereinafter fully described and claimed.

In the accompanying drawing, which illustrates the preferred embodiment of our invention, Fig. 1 is a side elevation of the end portions of a chain provided with our improved connector.

Fig. 2 is a longitudinal section on the line 2—2 of Fig. 1, showing the insertible link in locked engagement with the connector.

Fig. 3 is a side elevation of the connector detached from both end links.

Fig. 4 is a longitudinal sectional view on the plane of the line 2—2 of Fig. 1, showing the locking pin and movable parts connected therewith in the release position with the insertible end link withdrawn from the tubular member.

Fig. 5 is a cross section on the line 5—5 of Fig. 2.

Similar reference characters designate similar parts in the different views.

1 designates a flat tubular member which constitutes the body of the connector and which is adapted to have inserted in one end thereof one end link 2, of a chain, the other end link, 3, of which has two eyes 4, through which extends a transverse pin 5, which also extends through a link engaging member comprising a plate 6, doubled upon itself around the pin 5, and having its ends extending into the adjacent end of the tubular member 1, to which the link engaging member is pivoted by means of a transverse securing pin 7, which extends through the member 1, and which also extends through the adjacent end portion of a longitudinal flat spring 8, normally disposed flatwise against the adjacent side of the member 1, and which has loosely attached to it one end of a transverse locking pin 9, which is slidably mounted in a transverse hole 10, extending through the member 1 and which is movable by the spring 8, to and from the locking position shown in Fig. 2. When in the locking position, the locking pin 9 is adapted to extend through the link 2, when the latter is inserted in the tubular member 1, to the locking position shown in Fig. 2.

For manually moving the spring 8 from the locking position shown in Fig. 2, to the release position shown in Fig. 4, there may be provided a manually operated pin 11, which is slidably mounted in a transverse hole 12, extending through the member 1, one end of said hole being counter-sunk and adapted to have seated therein the counter-sunk flat head 13 of the pin 11. Said head 13 bears against the inner side of the spring 8, and when the head 13 is seated in the hole 12, the other end of the pin 11 projects beyond the outer opposite side of the member 1.

To move the pin 9 to the release position, shown in Fig. 4, to permit the insertion or removal of the links 2, the operator depresses the pin 11 from the position shown in Fig. 2, until the normally projecting end of the pin 11 is flush with the adjacent side of the member 1, at which time the locking pin 9, will be in the release position shown in Fig. 4, at which time the inner end of the locking pin will clear the link 2. The link 2, if inserted, may then be withdrawn from the member 1 or if it is withdrawn, it may be inserted in the member 1 to the position shown in Fig. 2, following which the operator will remove the pressure from the pin 11, upon which the spring 8 will force the locking pin 9 through the link 2, to the locking position shown in Fig. 2, in which position the link 2 will be held securely attached to the member 1.

When in the locking position, the pin 9 will transmit strain from the link 2 directly to the member 1, and owing to the loose connection of the pin 9 with the spring 8, no strain will be placed upon the latter.

As the swivel 6 is pivoted on the pin 7, and the latter is perpendicular to the pin 5, the member 1 has a universal joint connection with the link 3, thus enabling the member 1 to be swung freely in all directions, thereby permitting ready connection to be easily made between the member 1 and link 2, when the chain is being applied to a tire.

We do not limit our invention to the structure shown and described, as many modifications, within the scope of the appended claims, may be made without departing from the spirit of our invention.

What we claim is:—

1. A chain connector comprising a tubular member adapted to receive in one end a chain link, a pin transversely slidable in said member to and from a position in which it will extend through said link, a spring attached to said member and to said pin and arranged to force the latter to said position, link attaching means at the other end of said member, and manually operated means transversely movable through said member and adapted to engage said spring and to force the latter from said position, substantially as set forth.

2. A chain connector comprising a tubular member adapted to receive in one end a chain link, a pin transversely slidable through said member into and out of a position in which it will extend through said link, a spring for normally forcing the pin to said position and a link engaging member pivoted to the other end of said member, and having means for pivotal attachment to a chain link, substantially as set forth.

3. A chain connector comprising a tubular member adapted to receive in one end a chain link, a pin transversely slidable through said member to and from a position in which it will extend through said link, a flat spring attached to the outer side of said member and arranged to normally force said pin to said position, and a link engaging member pivoted to the other end of said member, and having means for pivotal attachment to a chain link substantially as set forth.

4. A chain connector comprising a tubular member adapted to receive in one end a chain link, a pin transversely slidable through said member to and from a position in which it is adapted to extend through said link, a flat spring disposed longitudinally at the outer side of said member and normally forcing said pin to said position, a securing pin extending through said spring and transversely through said member, and a link engaging member arranged to pivotally engage a chain link and pivoted to said securing pin, substantially as set forth.

5. A chain connector comprising a tubular member adapted to receive in one end a chain link, a pin transversely slidable through said member to and from a position in which it is adapted to extend through said link, a flat spring disposed longitudinally at the outer side of said member and normally forcing said pin to said position, a securing pin extending transversely through said spring and said member, a link engaging member pivoted to said securing pin and having means for being pivotally attached to a chain link and manually operated means for forcing the spring from said position, substantially as set forth.

6. A chain connector comprising a tubular member adapted to receive in one end a chain link, means at the other end of said member for attachment to a chain link, a transverse pin slidable through said member to and from a position in which it is adapted to extend through a link inserted into said member, a flat spring attached adjacent to one end to the outer side of said member and engaging and normally forcing said pin to said position, and a manually slidable pin extending transversely through said member and bearing at one end against the inner side of said spring and arranged to force the latter from said position, substantially as set forth.

7. A chain connector comprising a tubular member adapted to receive in one end a chain link, a pin transversely slidable in said member to and from a position in which it is adapted to extend through said link, a flat spring attached at one end to the outer side of said member and engaging and normally forcing said pin to said position, link engaging means at the other end of said member, and a manually operated pin transversely slidable in said member and bearing at one end against the inner side of said spring and arranged to force the latter outwardly to a position in which the first named pin will release an inserted link engaged thereby, substantially as set forth.

8. A chain connector comprising a tubular member adapted to receive in one end a chain link, a locking pin transversely slidable in said member to and from a position in which it is adapted to extend through a link inserted in said member, a securing pin extending through said member, a longitudinal flat spring attached by said securing pin to the outer side of said member and bearing against the locking pin and arranged to move it to and from the locking position, a manually operated pin extending through and slidable in said member and bearing against the inner side of said spring and arranged, when depressed, to force the spring to releasing position and a link engaging member pivoted to said securing pin and having means for pivotal engagement with a chain link, substantially as set forth.

9. In a chain, the combination with two end links of a chain, of a tubular member attached at one end to one of said links and adapted to receive in its other end the other link, a flat spring attached at one end to the outer side of said tubular member, a locking pin transversely slidable in said member and engaged by and movable with said spring to and from a position in which it is adapted to extend through the inserted link, and a manually operated pin transversely slidable through said tubular member and bearing at one end against the inner side of said spring and arranged, when forced in one direction, to move said spring and with it said locking pin to releasing position substantially as set forth.

In testimony whereof we have signed our names to this specification.

MARION C. WILLS.
JOSEPH S. DANIEL.